United States Patent Office 3,321,492
Patented May 23, 1967

1

3,321,492
2-OXABICYCLO(3.3.0)-3,7-OCTADIENE

John Edward Franz, Crestwood, Mo., assignor to Monsanto Company, St. Louis, Mo., a corporation of Delaware No Drawing. Filed Apr. 5, 1966, Ser. No. 540,199
1 Claim. (Cl. 260—346.2)

This invention relates to 2-oxabicyclo(3.3.0)-3,7-octadiene as a new compound. 2-oxabicyclo(3.3.0)-3,7-octadiene can be readily prepared by oxidizing bicyclo(2.2.1) heptadiene with peracetic acid.

The invention will be more fully understood by reference to the following example, which describes the detailed preparation of 2-oxabicyclo(3.3.0)-3.7-octadiene. Such example is given for the purpose of illustration only, and is not to be construed as limiting the scope of this invention in any way.

EXAMPLE 1

To a suitable reaction vessel, there are charged 106.0 grams (1.0 mole) of sodium carbonate, 74.5 grams (0.8 mole) of bicyclo(2.2.1) heptadiene and 650 ml. of methylene dichloride. The mixture is cooled to 20° C. There is added, dropwise, 77.0 grams (0.4 mole) of 40% peracetic acid over a period of about one hour, during which time the temperature is maintained at about 20° C. The reaction mixture is stirred for an additional two hours at a temperature of about 20–25° C. and filtered. The reaction mixture is then held at room tempertaure for a period of 48 hours. The solvent is removed at reduced pressure and the residue is distilled at 58–83° C. at 75 mm. Hg. The distillate is chromatographed on alumina. After elution with a 1:4 mixture of ether-petroleum ether, 2-oxabicyclo(3.3.0)-3,7-octadiene is obtained as a volatile colorless oil. When tested by IR spectrum analysis the presence of a vinyl ether linkage is evidenced by the presence of a 6.2 micron band.

The product of this invention is useful in preparing polymers which can be extruded, mechanically milled, cast or molded as desired. The polymers can also be blended with anti-oxidants, stabilizers, plasticizers, fillers, pigments and the like, or mixed with other polymeric materials, waxes and the like. In general, aside from the relatively higher values for such properties as softening point, density, stiffness and the like, the polymers embodying this invention can be treated in similar manner to those obtained by other processes.

2

EXAMPLE 2

*Copolymer preparation*

A mixture of 75.6 grams (0.9 mole) of 4-methyl-1-pentene and 10.8 grams (0.1 mole) of 2-oxabicyclo (3.3.0)-3,7-octadiene is polymerized in the presence of an aluminum triisobutyl catalyst. The product is washed with isopropyl alcohol and dried under reduced pressure to give a pure, white granular product. The product is a high molecular weight linear polymer which forms viscous dilute solutions in suitable organic solvents. A range of polymer properties is obtained by varying the mol ratios of the olefinic reactants.

EXAMPLE 3

*Cross-linked polymer*

The product of Example 2 is rendered insoluble by cross-linking polymerization with the use of boron trifluoride catalyst.

The cross-linking reaction can be carried out in varied sites, such as molds where thermoset castings are to be made, material interstices, surfaces and interfaces when laminating and adhering activities are carried on. In addition, the cross-linking reaction can be carried out in the presence of various inert fillers, pigments, etc.

The cross-linked polymers which eventuate from Example 3 have broad utility in application where qualities of thermosetting, dimensional stability and solvent resistance are desired. These will include moldings, castings, films, fibers, laminates, etc. They are particularly attractive in adhesion and laminating applications. They can be cured or set from the prepolymers state to final cross-linked state within a comparatively short time using relatively mild conditions. In addition, these polymers exhibit low dissipation factors making them extremely useful as potting compounds for electrical components.

While this invention has been described with respect to certain specific embodiments, it is not so limited. It is to be understood that variations and modifications thereof may be made without departing from the spirit and scope of the invention.

The embodiments of the invention in which an exclusive property or privilege is claimed are defined as follows:

2-oxabicyclo(3.3.0)-3,7-octadiene.

No references cited.

ALEX MAZEL, *Primary Examiner.*
HENRY R. JILES, *Examiner.*
RAY BOYD, *Assistant Examiner.*